United States Patent [19]

Samour

[11] 3,759,982
[45] Sept. 18, 1973

[54] ANIONIC COMPLEXES OF MONOMERIC EMULSION STABILIZERS

[75] Inventor: Carlos M. Samour, Wellesley, Mass.

[73] Assignee: The Kendall Company, Walpole, Mass.

[22] Filed: May 26, 1970

[21] Appl. No.: 40,705

[52] U.S. Cl. 260/485 J, 117/161 UZ, 260/29.6 TA, 260/29.6 SQ, 260/29.6 HN, 260/79.3 M, 260/80.71, 260/85.5 ES, 260/85.5 AM, 260/86.1 N, 260/86.3, 260/87.1, 260/247, 260/247.1, 260/247.2 A, 260/247.2 B, 260/293.85, 260/293.86, 260/293.87, 260/458, 260/459, 260/481 R, 260/482 R, 260/482 P, 260/485 H, 260/486 R, 260/486 H, 260/501.12, 260/501.13, 260/501.15, 260/924

[51] Int. Cl............................................. C07c 69/40

[58] Field of Search .................................. 260/485 J

[56] References Cited
UNITED STATES PATENTS

| | | | |
|---|---|---|---|
| 3,288,770 | 11/1966 | Butler | 260/88.3 |
| 3,412,019 | 11/1968 | Hoover et al. | 210/54 |
| 3,515,707 | 6/1970 | Reimschuessel | 260/89.7 |

Primary Examiner—Lorraine A. Weinberger
Assistant Examiner—E. Jane Skelly
Attorney—Ellen P. Trevors and Robert D. Chodera

[57] ABSTRACT

Anionic complexes of quaternary ammonium salts having an ethylenically-unsaturated radical and a lipophilic radical covalently linked to the quaternary nitrogen atom are disclosed. These anionic complexes are useful as monomeric emulsion stabilizers.

3 Claims, No Drawings

ANIONIC COMPLEXES OF MONOMERIC EMULSION STABILIZERS

This invention relates to anionic complexes of selected quaternary ammonium salts, and preferably to anionic complexes containing an ethylenically unsaturated group and two lipophilic radicals.

Polymeric latices, derived from ethylenically unsaturated monomers, are widely used for a variety of applications, such as adhesive masses and binders for nonwoven fabrics. Most conventional polymeric latices are produced by an emulsion polymerization process, in which monomeric materials are polymerized while they are dispersed in an aqueous medium by means of a surface active agent. The surface active agent may be anionic in nature, such as soap or sodium lauryl sulfate. Alternatively, it may be of a nonionic type as represented by various ethylene oxide derivatives, or by polyhydroxy compounds, or it may be cationic, as represented by alkyl ammonium halides. Cationic agents are preferably combined with a nonionic agent for improved performance. The polymerization of monomeric materials is also frequently effected in the presence of water-soluble protective colloids or stabilizing agents. Any of the above emulsifying or stabilizing agents leads to the presence of a water-sensitive ingredient in the final polymeric latex. For latex utilizations wherein wet strength and resistance to the influence of water are desirable, as in most paper coatings, nonwoven fabrics, certain pressure-sensitive adhesive tapes, and the like, the presence of a water-sensitive ingredient in the polymeric mass is undesirable. A preferred method of avoiding the presence of water-sensitive elements in a polymeric latex is to employ what is termed herein monomeric emulsion stabilizers — that is, a class of organic monomer which copolymerizes with the ethylenically unsaturated monomers, becoming a part of the final polymer, but which stabilizes the polymerization process against the formation of coagulum and against subsequent phase separation. Such monomeric emulsion stabilizers may be cationically charged nitrogen compounds as set forth in U.S. Pat. No. 3,399,159 wherein the use of monomers such as vinyl pyridines, acid-amines, and certain nitrogen-containing acrylic derivatives is described.

Now it has been found that anionic complexes of selected quaternary ammonium salts are useful monomeric emulsion stabilizers for the polymerization of ethylenically-unsaturated monomers.

More particularly, the compounds of this invention have the formula

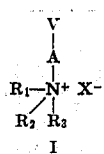

I wherein V is an ethylenically-unsaturated radical; A is zero or a diradical; $R_1$ and $R_2$ are independently selected alkyl, hydroxyalkyl, aryl, $R_5$—O—CO—$CH_2$— or $R_5$—NH—CO—$CH_2$— wherein $R_5$ is hydrogen or alkyl, or together part of a heterocyclic amino radical in which the quaternary nitrogen atom in formula I is part of the ring; $R_3$ is a lipophilic radical comprising an aliphatic hydrocarbon group having about eight to about 28 carbon atoms; $X^-$ is alkyl sulfate wherein the alkyl moiety has seven to 28 carbon atoms, alkyl benzene sulfonate wherein the alkyl moiety has seven to 12 carbon atoms, phenoxy (or alkyl phenoxy) alkylene (or polyalkyleneoxy alkylene) sulfate having the formula R''—$C_6H_4$O—$CH_2$—CHR''' —O—$_nCH_2$—CHR''' $SO_4^-$ wherein R'' is hydrogen or alkyl having one to 12 carbon atoms, R''' is hydrogen or methyl and n is zero or an integer, dialkyl sulfosuccinate wherein the alkyl groups have one to 24 carbon atoms or alkyl phosphate wherein the alkyl group has one to 18 carbon atoms.

While any compound having the general formula I can be provided according to this invention, preferred monomeric emulsion stabilizers include those compounds I wherein V is an ethylenically unsaturated radical selected from the group consisting of acryloyloxy, methacryloyloxy, acrylamido, methacrylamido, vinyloxy, allyloxy, methallyloxy, vinylacetoxy, allylacetoxy, methallylacetoxy, allyl, methallyl, 4-hydroxymaleoyloxy, 4-hydroxyfumaroyloxy, 4-hydroxymaleoylamino, 4-hydroxyfumaroylamino, 4hydroxycitraconyloxy, 4-hydroxycitraconylamino, 4-hydroxyitaconyloxy and 4hydroxyitaconylamino; A is ethylene, propylene, isopropylene, 2-hydroxypropylene, acetoxypropylene or —O—$CH_2$—$CHR_4$(O—$CH_2$—$CHR_4)_n$ where n is zero to four and $R_4$ is hydrogen or methyl with the proviso that A is zero where V is vinylacetoxy, allylacetoxy, methallylacetoxy, allyl or methallyl; $R_1$ and $R_2$ are independently selected from the group consisting of alkyl having one to seven carbon atoms, hydroxyalkyl having one to seven carbon atoms, benzyl, $R_5$—O—CO—$CH_2$— and $R_5$—NH—CO—$CH_2$— where $R_5$ is hydrogen or alkyl having one to four carbon atoms; or together part of a morpholinium or piperidinium moiety; and $R_3$ and $X^-$ are as previously described.

By the term "lipophilic radical" in the claims and specification herein is meant a radical containing an aliphatic hydrocarbon chain having from about eight to about 28 carbon atoms, and preferably from about nine to about 18 carbon atoms, including saturated, unsaturated, straight-chain and branched groups. This aliphatic hydrocarbon chain can be covalently linked to the nitrogen either directly or through an intermediate linkage as illustrated below where L represents the aliphatic hydrocarbon chain: a benzyl group,

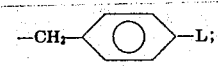

an ester or amide group such as —$CH_2$—CHR'—ACO—L wherein R' is hydrogen or methyl and A is oxygen or —NH—;

a polyalkylene oxide group such as —$CH_2$—CH$R_6$—(O—$CH_2$—CH$R_6)_n$—OL wherein $R_6$ is hydrogen or methyl and n is zero to four;

an acetoxy or acetamido group such as —$CH_2$—CO—OL and —$CH_2$—CO—NHL;

alkylene ethers such as —$CH_2$—O—L and —$CH_2$—$CH_2$—O—L;

a hydroxysuccinyloxy or hydroxysuccinylamino group having the formula —$R_7$—A—CO—CHL—$CH_2$—COOH wherein $R_7$ is a diradical, preferably ethylene, propylene, isopropylene, 2-hydroxypropylene, acetoxypropylene, or —O—$CH_2$—CH$R_8$(O—CH- $_2$—CHR$_8$)$_n$— where R$_8$ is hydrogen or methyl and $n$ is zero to four, and A is oxygen or —NH—; and isomers of the aforementioned hydroxysuccinyloxy or hydroxysuccinylamino groups wherein the aliphatic hydrocarbon chain L is attached to the carbon atom adjacent to the carboxyl group.

The anionic complexes having the formula I are readily prepared from the corresponding quaternary ammonium halides. Methods for synthesizing the latter compounds are fully described in copending U.S. Pat. applications Ser. No. 867,899, and Ser. No. 867,900 filed Oct. 20, 1969, and these applications are incorporated by reference herein.

Thus, the appropriate quaternary ammonium halide is reacted with an alkali metal or ammonium salt such as an alkali metal alkyl sulfate, an alkali metal alkyl benzene sulfonate, an ammonium phenoxy (or alkyl phenoxy) alkylene (or polyalkyleneoxy alkylene) sulfate, an alkali metal dialkyl sulfosuccinate or an alkali metal alkyl phosphate. Exemplificative salts include sodium heptyl sulfate, sodium iso-octyl sulfate, sodium oleoyl sulfate, sodium octacosyl sulfate, sodium dodecyl benzene sulfonate, di-tetradecyl sodium sulfosuccinate, dimethyl sodium sulfosuccinate, sodium dimethyl phosphate, sodium octadecyl phosphate, sodium di-2-ethyl hexyl phosphate, etc.

The reaction to provide compounds I is readily carried out at room temperature, although higher and lower temperatures can be employed.

Although the reactions proceed readily in the absence of a solvent, diluents such as water, acetonitrile, dimethylformamide, ethyl acetate, methanol and methylene chloride can be suitably employed. Monomers such as acrylonitrile and ethyl acrylate can also be utilized as solvents in the preparation of the monomeric emulsion stabilizers. While compounds I can be isolated prior to use in polymerization reactions, preferably they are used in their reaction solutions.

As previously indicated, particularly preferred monomeric emulsion stabilizers are those having two lipophilic radicals, viz, compounds having the formula I wherein X$^-$ is alkyl sulfate wherein the alkyl group has seven to 28 carbon atoms, alkyl benzene sulfonate wherein the alkyl group has seven to 12 carbon atoms, dialkyl sulfosuccinate wherein the alkyl groups have seven to 24 carbon atoms, dialkyl phosphate wherein the alkyl groups have seven to 18 carbon atoms, or R''—C$_6$H$_4$O—CH$_2$—CHR''' —O—$_n$CH$_2$—CHR''' SO$_4^-$ wherein R'' is alkyl having seven to 12 carbon atoms, R''' is hydrogen or methyl and $n$ is zero or an integer. It is preferable to synthesize these compounds in an aqueous solution, and use them as monomeric emulsion stabilizers in their reaction solutions without removing the halide salt by-products.

Illustrative ethylenically-unsaturated monomers suitable for copolymerizing with the monomeric emulsion stabilizers of this invention comprise vinyl acetate, vinyl chloride, acrylonitrile, and acrylic monomers in general represented by the formula

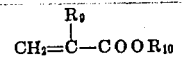

where R$_9$ is a hydrogen atom or a methyl group, and R$_{10}$ is an alkyl radical of one to 14, and preferably one to four carbon atoms. As is known in the art of preparing acrylic ester polymers, the softness of the polymer and the difficulty of initiating polymerization increase as the number of carbon atoms in the ester group increases. In the practice of this invention, when the acrylic monomer contains more than eight carbon atoms in the ester group, it is advantageous to mix therewith at least about 20 mole percent of an acrylic ester with fewer than four carbon atoms in the ester group to initiate polymerization and enhance the stability of the dispersion.

Mixtures of more than one such ethylenically unsaturated monomer may be used, and in order to impart special properties of toughness, rigidity, or cross-linking reactivity to the polymer, a minor proportion, usually less than 20 mole percent, of the major monomer may be replaced by some other ethylenically unsaturated monomer such as vinyl esters, typified by vinyl laurate and vinyl stearate; vinyl ethers such as vinyl methyl ether, vinyl ethyl ether, and vinyl butyl ether; diunsaturated monomers such as diethylene glycol diacrylate, ethylene glycol diitaconate, diallyl phthalate, divinyl benzene and the like; acrylic and methacrylic acids, acrylamide and methacrylamide, hydroxyethyl acrylate and methacrylate, and hydroxypropyl acrylate and methacrylate, and styrene.

In general, in the polymerization process of this invention, 0.1 to 10 percent by weight of monomeric emulsion stabilizer is employed, with 1 to 5 percent by weight being preferred. The amount of monomeric emulsion stabilizer is based on the total monomers added to the polymerization reaction.

Aqueous polymeric dispersions may be prepared according to this invention in which the solid polymer content is 40 percent to 50 percent by weight. If desired, the solids content may be diluted to 1 percent by weight or less, with excellent retention of stability at both the higher and lower concentrations.

The monomeric emulsion stabilizers of this invention are useful in both batch and continuous polymerization processes.

The following examples will serve to illustrate the practice of this invention.

EXAMPLE 1

Allyl hexadecyl dimethyl ammonium chloride was prepared by reacting allyl chloride with dimethyl hexadecyl amine as described in copending U.S. Pat. application Ser. No. 867,899. The amount of 15.1g. of allyl hexadecyl dimethyl ammonium chloride aqueous solution (23.5 percent by weight of the chloride) and 2.88g. dodecyl sodium sulfate was tumbled in 50g. water for 48 hours at room temperature to provide allyl hexadecyl dimethyl ammonium dodecyl sulfate.

The amount of 22.5g. of this monomeric emulsion stabilizer solution in 275g. water was charged to a 4-neck resin kettle equipped with a thermometer, stirrer, nitrogen inlet and dropping apparatus. To this solution was added, under nitrogen, 75g. vinyl acetate; the pH of the resulting emulsion was 4.5. After cooling to 19°C, 10ml of 3% H$_2$O$_2$ in H$_2$O were added to the emulsion followed by the dropwise addition of a reductant solution comprising 0.02g. ferrous ammonium sulfate and 0.4g. ascorbic acid in 10ml H$_2$O. Polymerization was initiated after 0.8ml of reductant solution had been added as evidenced by an exotherm of about 28° in 10 minutes. A total of 10ml of reductant solution and 15ml of H$_2$O$_2$ solution was added until completion of the polymerization as evidenced by a lack of exotherm upon the further addition of a slight amount of $H_2O_2$ and reductant solution. The yield of polymer was 89 percent of theoretical and no coagulum formed.

EXAMPLE 2

Allyl hexadecyl dimethyl ammonium chloride (35.5g.) in 115.5g. water were tumbled with 35.8g. sodium dodecylbenzene sulfonate at room temperature for 24 hours. The resulting solution was extracted with hexane, and the hexane layer dried over anhydrous sodium sulfate. After removal of solvent under vacuum, a gummy yellow solid, identified as allyl hexadecyl dimethyl ammonium dodecylbenzene sulfonate, was obtained.

Following the procedure of Example 1, a mixture of ethyl acrylate (80g.), butyl acrylate (10g.) and acrylonitrile (10g.) in water (280g.) was emulsified using 3g. of the allyl hexadecyl dimethyl ammonium benzene sulfonate. The pH of the initial emulsion was about 5.0–5.5. After cooling to 17°C, 10ml of 3% $H_2O_2$ in $H_2O$ was added, followed by the dropwise addition of the reductant solution described in Example 1. A total of 4ml of reductant solution and 11ml of $H_2O_2$ solution was employed in the polymerization.

EXAMPLE 3

Allyl dimethyl dodecenyl hydroxysuccinyloxyethyl ammonium chloride was prepared by reacting allyl chloride with dimethyl amino ethanol in acetonitrile, followed by reaction with dodecenyl succinic anhydride in acetonitrile as described in copending patent application U.S. Ser. No. 867,900. The amount of 43.2g. of this compound was tumbled with 32.2g. sodium dodecylbenzene sulfonate in 300ml acetonitrile for 24 hours at room temperature. The resulting precipitate was removed by filtration, washed with acetonitrile and dried. Removal of the acetonitrile provided 64.5g. of allyl dimethyl dodecenyl hydroxysuccinyloxyethyl ammonium dodecylbenzene sulfonate.

A mixture of ethyl acrylate (280g.), acrylonitrile (35g.) and butyl acrylate (35g.) in 843g. of $H_2O$ was emulsified employing 157g. of an aqueous solution containing 10.5g. of the allyl dimethyl dodecenyl hydroxysuccinyloxyethyl ammonium chloride. The pH of the initial emulsion was about 4.5. After cooling to 16°C, 35ml of 3% $H_2O_2$ in $H_2O$ was added, followed by the dropwise addition of the reductant solution described in the previous examples. Polymerization was initiated upon the addition of 15ml of reductant solution.

What is claimed is:

1. A compound having the formula

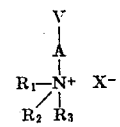

wherein V is allyl or methallyl, A is a direct linkage, $R_1$ and $R_2$ are independently selected alkyl having one to seven carbon atoms, $R_3$ is $-R_7-O-CO-CHL-CH_2-COOH$ or $-R_7-O-CO-CH_2-CHL-COOH$ wherein $R_7$ is ethylene, propylene or isopropylene and L is an aliphatic hydrocarbon chain having from about eight to about 28 carbon atoms, and $X^-$ is an alkyl benzene sulfonate wherein the alkyl moiety has seven to 12 carbon atoms.

2. A compound having the formula

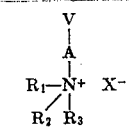

wherein V is allyl or methallyl, A is a direct linkage, $R_1$ and $R_2$ are independently selected alkyl having one to seven carbon atoms, $R_3$ is $-R_7-O-CO-CHL-CH_2-COOH$ or $-R_7-O-CO-CH_2-CHL-COOH$ wherein $R_7$ is ethylene, propylene or isopropylene and L is dodecenyl, and $X^-$ is an alkyl benzene sulfonate wherein the alkyl moiety has seven to 12 carbon atoms.

3. The compound of claim 2 having the name N-allyl, N,N-dimethyl, N-(dodecenyl hydroxysuccinyloxy ethyl) ammonium dodecyl benzene sulfonate.

* * * * *